US012784967B2

(12) United States Patent
Eda et al.

(10) Patent No.: US 12,784,967 B2
(45) Date of Patent: Nov. 3, 2026

(54) COIL COMPONENT

(71) Applicant: TDK CORPORATION, Tokyo (JP)

(72) Inventors: Hokuto Eda, Tokyo (JP); Masataro Saito, Tokyo (JP); Kohei Takahashi, Tokyo (JP); Takamasa Iwasaki, Tokyo (JP); Hiroki Asafusa, Tokyo (JP); Takahiro Nemoto, Tokyo (JP)

(73) Assignee: TDK CORPORATION, Tokyo (JP)

( * ) Notice: Subject to any disclaimer, the term of this patent is extended or adjusted under 35 U.S.C. 154(b) by 560 days.

(21) Appl. No.: 18/490,358

(22) Filed: Oct. 19, 2023

(65) Prior Publication Data

US 2024/0136116 A1 Apr. 25, 2024
US 2024/0234018 A9 Jul. 11, 2024

(30) Foreign Application Priority Data

Oct. 21, 2022 (JP) ................................ 2022-168911

(51) Int. Cl.
*H01F 27/28* (2006.01)
*H01F 27/29* (2006.01)
*H01F 27/30* (2006.01)

(52) U.S. Cl.
CPC ....... *H01F 27/292* (2013.01); *H01F 27/2804* (2013.01); *H01F 27/306* (2013.01)

(58) Field of Classification Search
CPC ........ H01F 27/28; H01F 27/29; H01F 27/292; H01F 27/32; H01F 5/00
USPC ........................................ 326/185, 199, 206
See application file for complete search history.

(56) References Cited

U.S. PATENT DOCUMENTS

| | | | | |
|---|---|---|---|---|
| 12,424,375 B2 * | 9/2025 | Kim | ...................... | H01F 27/022 |
| 12,482,591 B2 * | 11/2025 | Saito | ...................... | H01F 27/255 |
| 12,603,220 B2 * | 4/2026 | Yoshino | ................ | H01F 17/045 |
| 2017/0032884 A1 | 2/2017 | Choi et al. | | |
| 2021/0125766 A1 | 4/2021 | Choi et al. | | |

FOREIGN PATENT DOCUMENTS

| | | |
|---|---|---|
| JP | H05-25816 U | 4/1993 |
| JP | 2017-034227 A | 2/2017 |
| JP | 2021-103703 A | 7/2021 |

OTHER PUBLICATIONS

Jun. 2, 2026 Office Action issued in Japanese Patent Application No. 2022-168911.

* cited by examiner

*Primary Examiner* — Hai L Nguyen
(74) *Attorney, Agent, or Firm* — Oliff PLC

(57) ABSTRACT

Since the coil body of the coil component includes a plurality of coils and the first coil is one of the plurality of coils included in the coil body, the current route from the external terminal of the first to the outer peripheral turn of the second coil portion where stray capacitance occurs is significantly shorter than the route of current flowing between the pair of external terminals, and the voltage drop in the outer peripheral turn of the second coil portion is relatively small, so that stray capacitance between the second coil portion and the first external terminal is small.

7 Claims, 8 Drawing Sheets

COIL COMPONENT

CROSS-REFERENCE TO RELATED APPLICATIONS

This application is based upon and claims the benefit of priority from Japanese Patent Application No. 2022-168911, filed on 21 Oct. 2022, the entire contents of which are incorporated herein by reference.

TECHNICAL FIELD

The present disclosure relates to a coil component.

BACKGROUND

Known in the art is a coil component including a thin film coil used in a power supply circuit. Japanese Patent Publication No. 2017-34227 discloses a thin-film coil having a configuration in which a first coil portion wound in a spiral shape on one surface of a substrate and a second coil portion wound in a spiral shape on the other surface of the substrate are connected via a through-hole conductor provided through the substrate.

SUMMARY

Recently, a technique for superimposing a power supply and a signal on one coaxial cable (i.e., Power over Coax (PoC)) has been developed, and a coil component used in this technique is required to have high impedance from a low band to a high band in order to realize high signal transmission characteristics.

The inventors have found that it is effective to reduce the stray capacitance of the coil component and increase the self-resonant frequency (SRF) in order to realize high impedance from a low band to a high band.

According to the present disclosure, a coil component in which stray capacitance is reduced is provided.

A coil component according to one aspect of the present disclosure includes an element body having a pair of main surfaces facing each other, and a first end surface and a second end surface connecting the pair of main surfaces and parallel to each other, a substrate provided in the element body, extending parallel to the main surface of the element body, and having a first main surface and a second main surface parallel to the main surface of the element body, a coil body provided in the element body and including a plurality of coils each including a first coil portion in a spiral shape provided on the first main surface of the substrate, a second coil portion in a spiral shape provided on the second main surface of the substrate, and a through-hole conductor penetrating the substrate and electrically connecting the first coil portion and the second coil portion, the plurality of coils being connected in series and having one end portion exposed from the first end surface of the element body and the other end portion exposed from the second end surface of the element body, and a first external terminal provided on the first end surface of the element body and connected to one end portion of the coil body, a second external terminal provided on the second end surface of the element body and connected to the other end portion of the coil body, wherein the plurality of coils of the coil body include a first coil located on the first end surface side and connected to one end portion of the coil body and a second coil located on the second end surface side and connected to the other end portion of the coil body.

In the coil component, the coil body includes the plurality of coils including the first coil connected to the end portion of the coil body connected to the first external terminal provided on the first end surface of the element body and the second coil connected to the end portion of the coil body connected to the second external terminal provided on the second end surface of the element body. For example, in a case where the first coil portion of the first coil is connected to the first external terminal via the end portion of the coil body, in the second coil portion of the first coil provided on the second main surface of the substrate, a voltage drops with respect to the first external terminal, and thus a stray capacitance may be generated between the coil portion and the first external terminal. However, since the first coil is one of the plurality of coils included in the coil body, a voltage drop in the first coil is smaller than a voltage drops in a structure in which the coil body includes a single coil, and generated between the first coil portion of the second coil and the first external terminal is smaller. Similarly, the voltage drop of the second coil with respect to the second external terminal is smaller than the voltage drops in the structure in which the coil body includes a single coil. Therefore, the stray capacitance generated between the second coil portion of the second coil and the second external terminal is smaller.

In the coil component according to another aspect, the plurality of coils of the coil body are respectively wound around the plurality of through holes provided in the substrate.

In the coil component according to another aspect, the plurality of through holes are line-symmetric with respect to a reference line parallel to the end surface of the element body when viewed from the facing direction of the pair of main surfaces.

In the coil component according to another aspect, the winding direction of the first coil and the winding direction of the second coil are opposite to each other when viewed from the facing direction of the pair of main surfaces.

In the coil component according to another aspect, when viewed from the facing direction of the pair of main surfaces, the connection portion connecting the coils to each other extends to intersect the imaginary line that connects the axes of the coils.

In the coil component according to another aspect, the coil body is point-symmetric with respect to the center of the element body when viewed from the facing direction of the pair of main surfaces.

In the coil component according to another aspect, a coil end portion of the first coil portion of the first coil constitutes one end portion of the coil body and an axial position of the second coil portion of the first coil is farther from the first end surface than an axial position of the first coil portion when viewed from a facing direction of the pair of main surfaces, or, a coil end portion of the first coil portion of the second coil constitutes the other end portion of the coil body and an axial position of the second coil portion of the second coil is farther from the second end surface than an axial position of the first coil portion when viewed from a facing direction of the pair of main surfaces.

DETAILED DESCRIPTION

Figure 1:
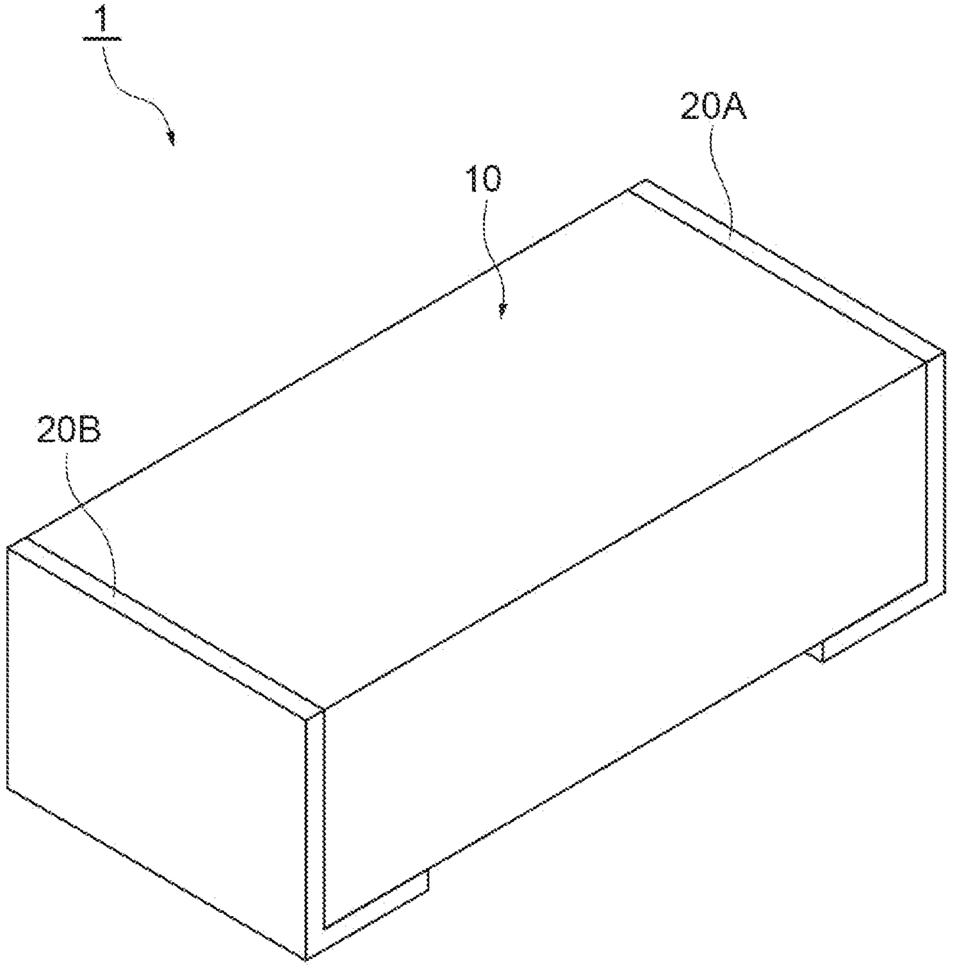
FIG. 1 is a perspective view showing a coil component according to an embodiment.

Hereinafter, embodiments for carrying out the present disclosure will be described with reference to the accompanying drawings. In the description of the drawings, the same or equivalent elements are denoted by the same reference numerals, and redundant description is omitted.

Figure 2:
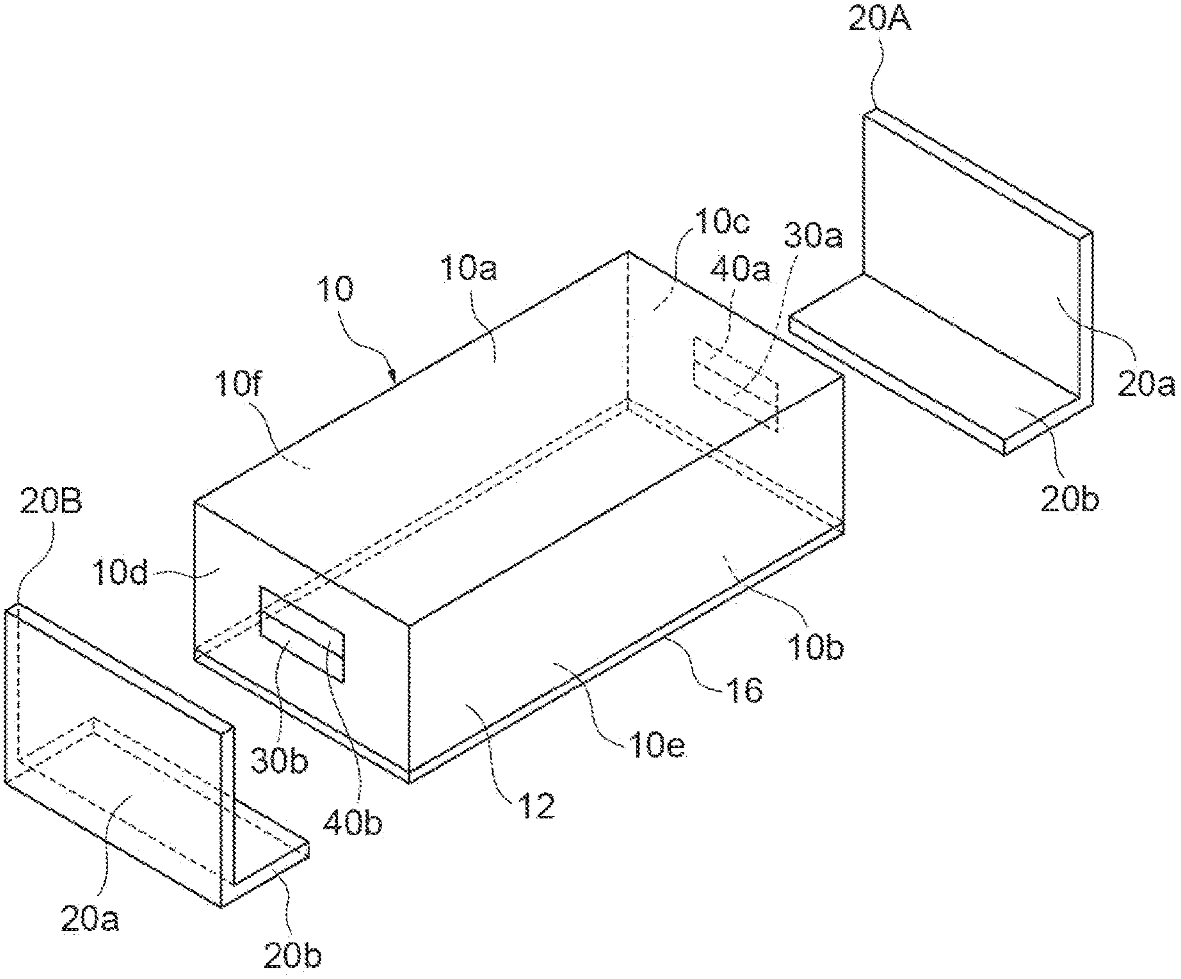
FIG. 2 is an exploded perspective view of the coil component shown in FIG. 1.

A coil component 1 according to an embodiment will be described with reference to FIGS. 1 to 6. As shown in FIGS. 1 and 2, the coil component 1 includes an element body 10 and a pair of external terminals 20A and 20B provided on the element body 10.

The element body 10 has an outer shape of a substantially rectangular parallelepiped shape and includes a pair of main surfaces 10*a* and 10*b* facing each other, a pair of end surfaces 10*c* and 10*d* facing each other, and a pair of side surfaces 10*e* and 10*f* facing each other. The pair of end surfaces 10*c* and 10*d* and the pair of side surfaces 10*e* and 10*f* connect the pair of main surfaces 10*a* and 10*b*. In the present embodiment, the facing direction of the pair of main surfaces 10*a* and 10*b* is the height direction of the element body 10, the facing direction of the pair of end surfaces 10*c* and 10*d* is the long-side direction of the element body 10, and the facing direction of the pair of side surfaces 10*e* and 10*f* is the short-side direction of the element body 10. In the present embodiment, the main surface 10*b* serves as a mounting surface facing a base substance on which the coil component 1 is mounted. As an example, the coil component 1 is designed to have dimensions of long side 2.0 mm, short side 1.25 mm, and 1.0 mm in height.

Of the pair of external terminals 20A and 20B, the first external terminal 20A is provided on the end surface 10*c* side of the element body 10. The first external terminal 20A includes a portion 20*a* covering the end surface 10*c* and a portion 20*b* covering a part of the main surface 10*b* on the end surface 10*c* side, and has an L-shaped cross section that continuously covers the end surface 10*c* and the main surface 10*b*. Of the pair of external terminals 20A and 20B, the second external terminal 20B is provided on the end surface 10*d* side of the element body 10. Like the first external terminal 20A, the second external terminal 20B includes a portion 20*a* covering the end surface 10*d* and a portion 20*b* covering a part of the main surface 10*b* on the end surface 10*d* side, and has an L-shaped cross-section continuously covering the end surface 10*d* and the main surface 10*b*.

Figure 3:
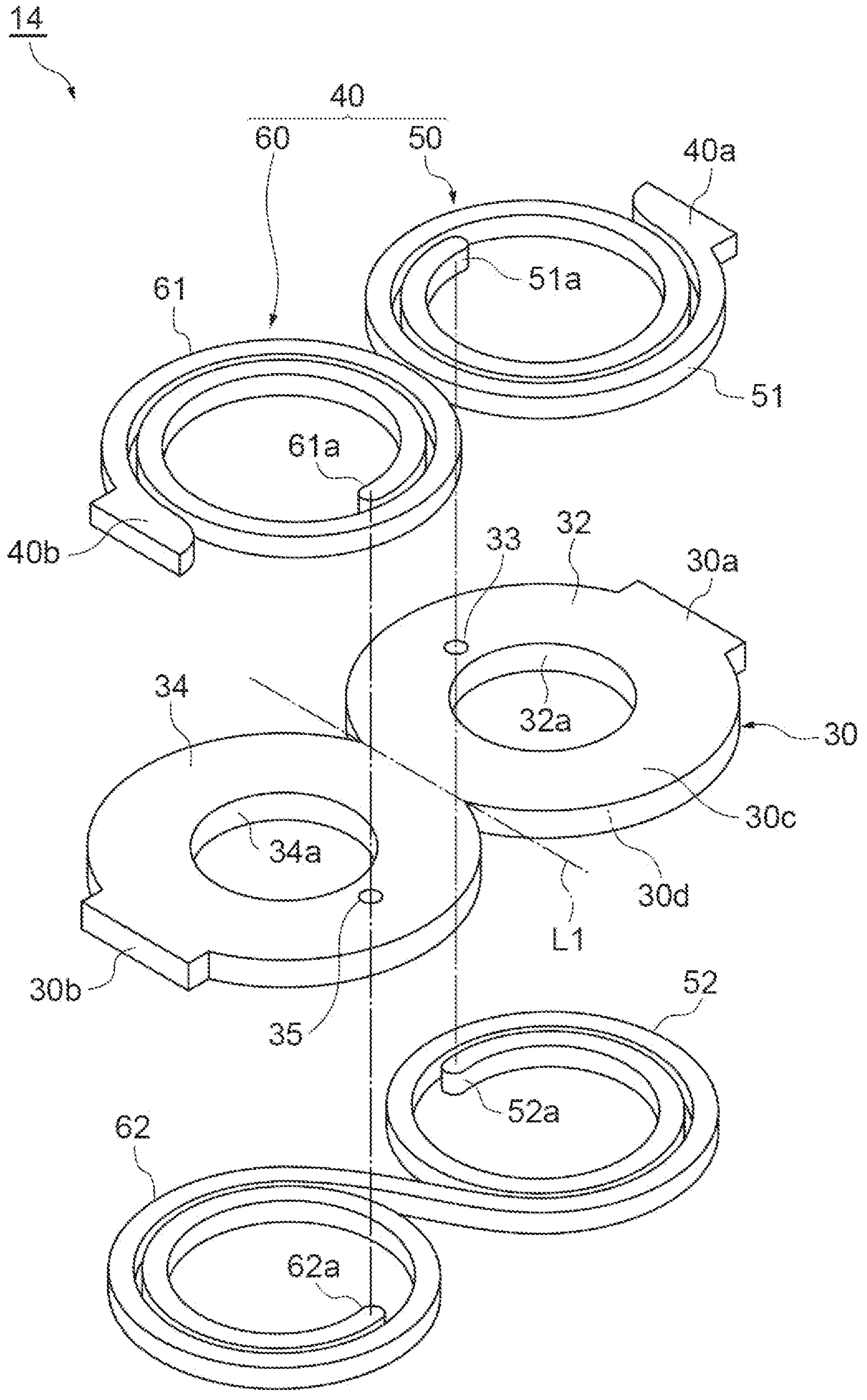
FIG. 3 is an exploded perspective view showing a coil body provided in the element body shown in FIG. 2.

The element body 10 has a configuration in which the coil structure 14 shown in FIG. 3 is provided inside the magnetic material 12. A magnetic powder-containing resin can be used as the magnetic material 12 constituting the element body 10. The magnetic powder-containing resin has a configuration in which magnetic powder such as metal magnetic powder or ferrite powder is dispersed in the resin. The magnetic powder-containing resin may contain both the metal magnetic powder and the ferrite powder as the magnetic powder. The metal magnetic powder may be composed of, for example, an iron-nickel alloy (permalloy), carbonyl iron, an amorphous, FeSiCr alloy in amorphous or crystalline state, sendust, or the like. The resin used for the magnetic powder-containing resin is, for example, a thermosetting epoxy resin. The content of the magnetic powder contained in the magnetic powder-containing polymer is, for example, 90 to 99 wt %. In the present embodiment, only the main surface 10*b* of the element body 10 is formed of the insulating layer 16 made of an insulating material such as an insulating resin (for example, an epoxy resin) instead of the magnetic powder-containing resin. Although the portions 20*b* of the pair of external terminals 20A and 20B are close to each other on the main surface 10*b*, the insulating layer 16 improves the breakdown voltage between the pair of external terminals 20A and 20B on the main surface 10*b*. In addition, in the main surface 10*b*, the insulating material of the insulating layer 16 is interposed between each of the external terminals 20A and 20B and the magnetic-powder-containing resins (that is, each of the external terminals 20A and 20B is not in direct contact with the magnetic-powder-containing resins), thereby reducing the stray capacitance. The element body 10 may have a configuration in which the insulating layer 16 is not included, or may have an aspect in which the element body 10 is formed of only the magnetic powder-containing resin.

The coil structure 14 includes a substrate 30 and a coil body 40.

The substrate 30 extends between the pair of end surfaces 10*c* and 10*d* of the element body 10 and has end portions 10*c* and 10*d* exposed from the respective end surfaces 30*a* and 30*b*. The substrate 30 has a shape of a flat plate extending in parallel to the main surface 10*a* and 10*b* of the element body 10, and has an upper surface 30*c* (first main surface) located on the main surface 10*a* side and a lower surface 30*d* (second main surface) located on the main surface 10*b* side. The substrate 30 has a first portion 32 corresponding to a first coil 50 described later and a second portion 34 corresponding to a second coil 60, and through-holes 32*a* and 34*a* are provided in the first portion 32 and the second portion 34, respectively. In the present embodiment, the substrate 30 has an eight shape when viewed from the main surface 10*a* side of the element body 10, and has a line-symmetrical shape with respect to a reference line L1 parallel to the end surfaces 10*c* and 10*d* of the element body 10. The shapes and dimensions of the plurality of through-holes 32*a* and 34*a* are also line-symmetric with respect to the reference line L1.

The substrate 30 is made of a nonmagnetic insulating material. As the substrate 30, a substrate obtained by impregnating a glass cloth with a cyanate resin (BT (bismaleimide triazine) resin: registered trademark) can be used. In addition to the BT resin, polyimide, aramid, or the like can be used. Ceramic or glass can also be used as the material of the substrate 30. As the material of the substrate 30, a mass-produced printed circuit board material can be used, and a resin material used for BT printed circuit board, FR4 printed circuit board, or FR5 printed circuit board can be used.

The coil body 40 includes a plurality of coils arranged in the long-side direction of the element body 10, and includes two coils of a first coil 50 and a second coil 60 in the present embodiment. The plurality of coils included in the coil body 40 are connected in series, and in the present embodiment, the first coil 50 and the second coil 60 are connected in series. One end portion 40*a* of the coil body 40 is exposed to the end surface 30*c* of the element body 10 on the upper surface 10*c* of the substrate 30 and is connected to the first external terminal 20A. The other end portion 40*b* of the coil body 40 is exposed to the end surface 30*c* of the element body 10 on the upper surface 10*d* of the substrate 30 and is connected to the second external terminal 20B.

Each coil 50 and 60 included in the coil body 40 has first coil portions 51 and 61 provided on an upper surface 30*c* of the substrate 30 and second coil portions 52 and 62 provided on a lower surface 30*d* of the substrate 30, and through-hole conductors 33 and 35 provided through the substrate 30 to electrically connect the first coil portions 51 and 61 and the second coil portions 52 and 62.

Figure 4:
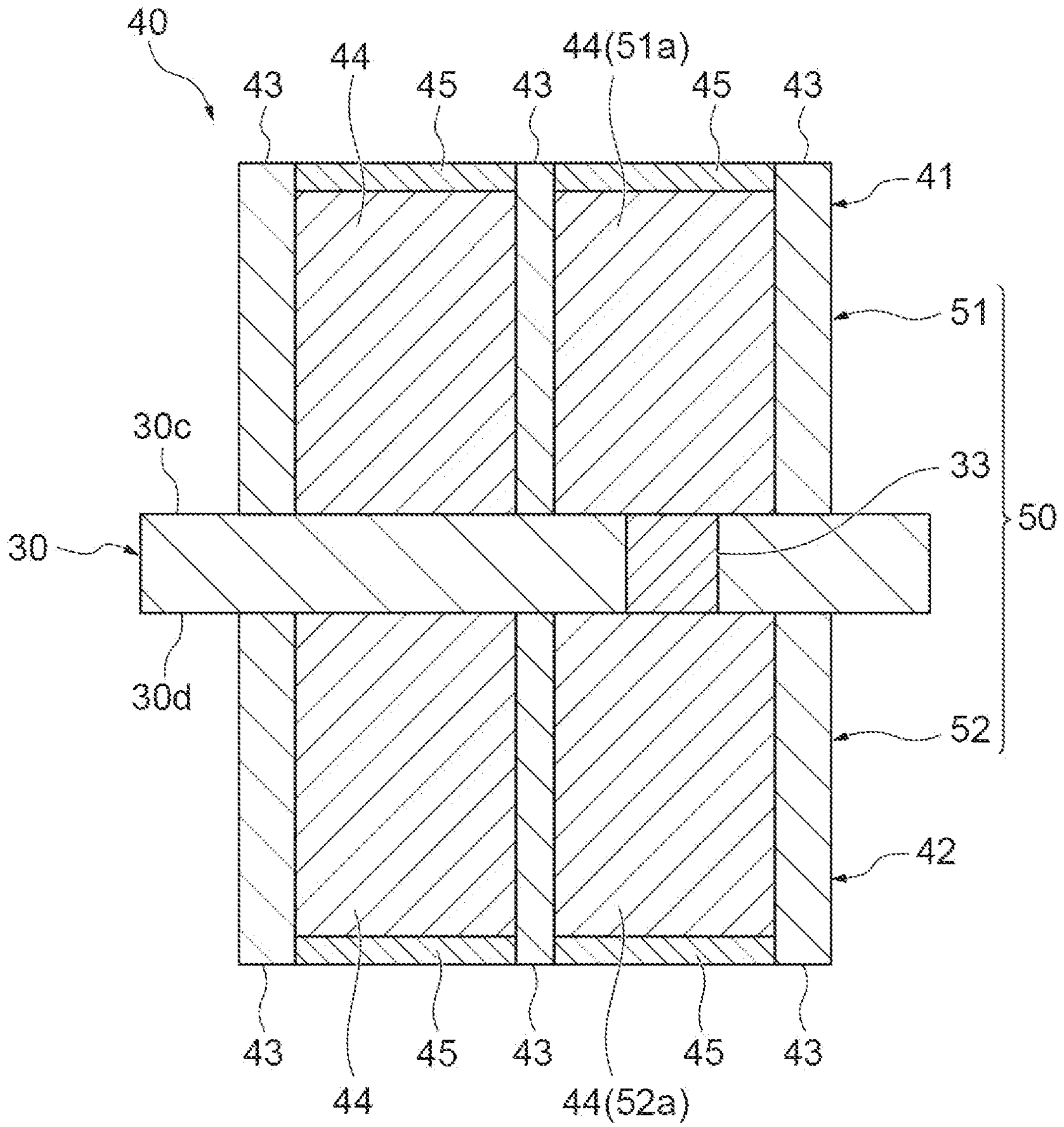
FIG. 4 is a cross-sectional view showing a structure of the coil shown in FIG. 3.

As shown in FIG. 4, resin bodies 41 and 42 are provided on an upper surface 30*c* and a lower surface 30*d* of the substrate 30, respectively, and regions of conductors 44 constituting the coil body 40 are defined by resin walls 43 of the resin bodies 41 and 42. Each of the resin bodies 41 and 42 is formed of a nonmagnetic resin material, and is a thick film resist patterned by known photolithography. As for the size of the resin wall 43, for example, the outermost resin wall 43 can be designed to be 20 μm in width. The conductor 44 of the coil body 40 can be formed by plating in a state where a growth region is defined by the resin walls 43 of each of the resin bodies 41 and 42. In the present embodiment, the cross-sectional dimensions (for example, width or height in a rectangular cross-section) of the conductor 44 constituting the coil body 40 is substantially uniform over the entire length of the coil body. The cross-sectional dimensions of the conductor 44 are, for example, 175 μm in height and 90 μm in width. An insulating coating 45 is provided on the surface of the conductor 44 to insulate the conductor 44 from the magnetic powder-containing resin constituting the element body 10.

Figure 5:
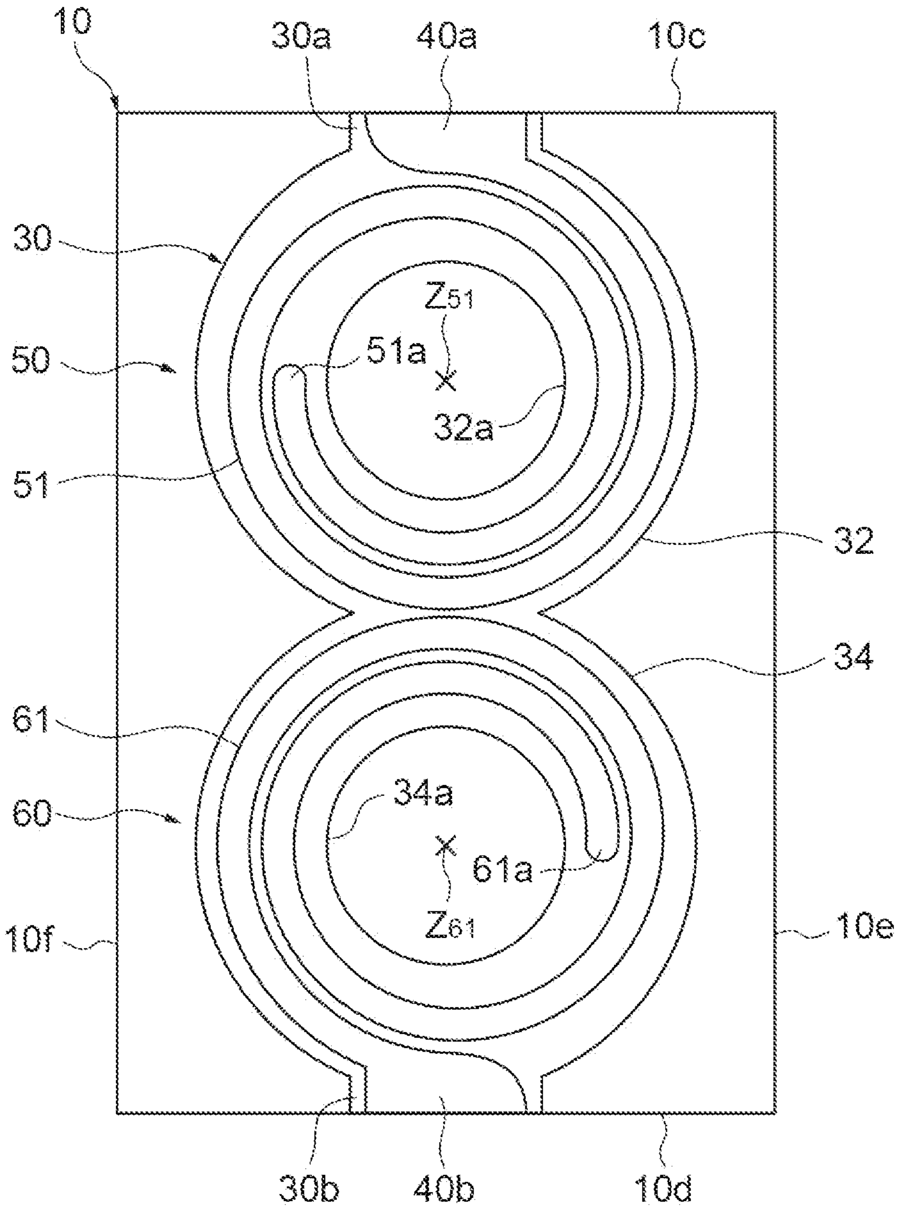
FIG. 5 is a plan view showing a first coil portion of each coil shown in FIG. 3.
Figure 6:
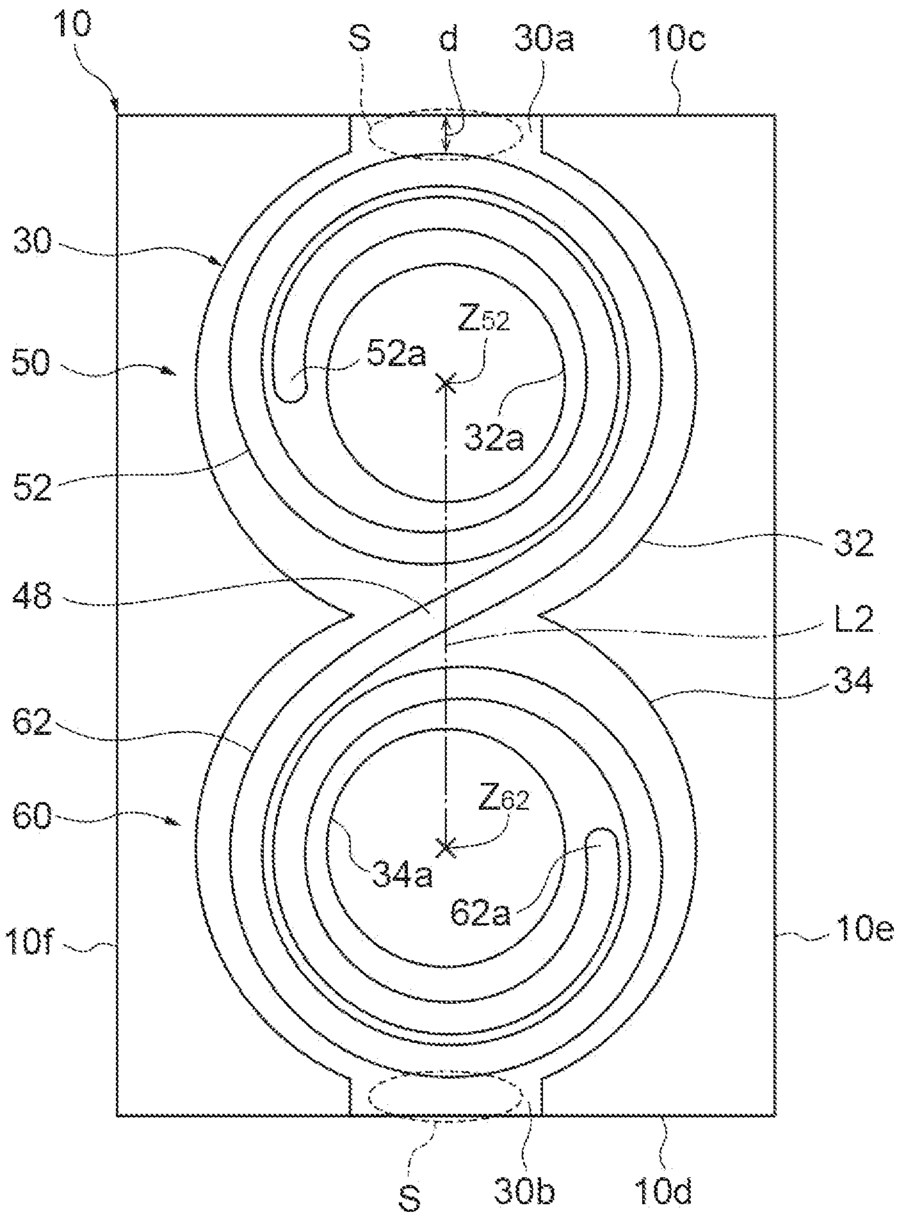
FIG. 6 is a plan view showing a second coil portion of each coil shown in FIG. 3.

Next, the configurations of the first coil 50 and the second coil 60 will be described in more detail with reference to FIGS. 5 and 6. Each of FIGS. 5 and 6 shows the positional relationship among the substrate 30, the first coil 50, and the second coil 60 when viewed from the main surface 10*a* side of the element body 10.

The first coil 50 is located on the end surface 10*c* (first end surface) side of the element body 10 and is connected to one end portion 40*a* of the coil body 40. As shown in FIG. 5, the first coil portion 51 of the first coil 50 is a planar spiral conductor pattern having a one layer structure in which about two turns are wound around the coil axis $Z_{51}$. The peripheral coil portion 51 is wound clockwise from the outer first turn toward the inner periphery turn. An outer end portion of the first coil portion 51 is connected to an end portion 40*a* of the coil body 40, and an inner end portion 51*a* of the first coil portion 51 is connected to a through-hole conductor 33 provided through the substrate 30 in a portion overlapping the inner end portion 51*a*. The first portion 32 of the substrate 30 overlapping the first coil portion 51 has a substantially annular shape, and has a through-hole 32*a* through which a portion around the coil axis $Z_{51}$ of the first coil portion 51 passes. The inner end portion 51*a* of the first coil portion 51 is located at an edge of the through hole 32*a* of the first portion 32.

The second coil 60 is located on the end surface 10*d* (second end surface) side of the element body 10 and is connected to the other end portion 40*b* of the coil body 40. As shown in FIG. 5, the first coil portion 61 of the second coil 60 is a planar spiral conductor pattern having a one layer structure in which about two turns are wound around the coil axis $Z_{61}$. The first coil portion 61 is wound counterclockwise from the inner periphery turn toward the outer periphery turn. An outer end portion of the first coil portion 61 is connected to an end portion 40*b* of the coil body 40, and an inner end portion 61*a* of the first coil portion 61 is connected to a through-hole conductor 35 provided through the substrate 30 in a portion overlapping the inner end portion 61*a*. The first portion 34 of the substrate 30 overlapping the first coil portion 61 has a substantially annular shape, and has a through-hole 34*a* through which a portion around the coil axis $Z_{61}$ of the first coil portion 61 passes. An inner end portion 61*a* of the first coil portion 61 is located at an edge of the through hole 34*a* of the second portion 34.

On the upper surface 30*c* of the substrate 30, the first coil portion 51 of the first coil 50 and the first coil portion 61 of the second coil 60 are separated from each other. In addition, the first coil portion 51 of the first coil 50 and the first coil portion 61 of the second coil 60 have symmetry, and particularly have a point-symmetric relationship with respect to the center of the element body 10 (or the center of the substrate 30). The first coil portion 51 of the first coil 50 and the first coil portion 61 of the second coil 60 are designed to have the same number of turns (turns) and the same conductor widths. In the present embodiment, the coil axis $Z_{51}$ of the first coil portion 51 and the coil axis $Z_{61}$ of the first coil portion 61 are aligned in the long-side direction of the element body 10 (that is, the facing direction of the end surfaces 10*c* and 10*d*).

As shown in FIG. 6, the second coil portion 52 of the first coil 50 is a planar spiral conductor pattern having a single-layer structure in which about two turns are wound around the coil axis $Z_{52}$. In the present embodiment, the coil axis $Z_{52}$ of the second coil portions 52 coincide with the coil axis $Z_{51}$ of the first coil portions 51. The second coil portion 52 is wound clockwise from the inner periphery turn toward the outer periphery turn. Therefore, in the first coil portion 51 and the second coil portion 52 of the first coil 50, when viewed from the main surface 10*a* side of the element body 10, a current flows in the same winding direction when the current flows. The inner end portion 52*a* of the second coil portion 52 is located at a position overlapping the through-hole conductor 33 on the lower surface 30*d* of the substrate 30 and is connected to the through-hole conductor 33. An outer end portion of the second coil portion 52 extends toward the end surface 10*d* side of the element body 10 and is connected to the second coil portion 62 of the second coil 60.

The second coil portion 62 of the second coil 60 is a planar spiral conductor pattern having a single-layer structure wound by about two turns around the coil axis $Z_{62}$. In the present embodiment, the coil axis $Z_{62}$ of the second coil portion 62 coincide with the coil axis $Z_{61}$ of the first coil portion 61. The second coil portion 62 is wound counterclockwise from the outer periphery turn toward the inner periphery turn. Therefore, in the first coil portion 61 and the second coil portion 62 of the second coil 60, when viewed from the main surface 10*a* side of the element body 10, a current flows in the same winding direction when the current flows. The inner end portion second of the 62*a* coil portion 62 is located at a position overlapping the through-hole conductor 35 on the lower surface 30*d* of the substrate 30 and is connected to the through-hole conductor 35. An outer end portion of the first coil portion 61 extends toward the end surface 10*c* side of the element body 10 and is connected to an outer end portion of the second coil portion 52 of the first coil 50.

On the lower surface 30*d* of the substrate 30, the second coil portion 52 of the first coil 50 and the second coil portion 62 of the second coil 60 are connected to each other. The connecting portion 48 in which the second coil portion 52 and the second coil portion 62 are connected extends so as to intersect an imaginary line L2 connecting the coil axes $Z_{52}$ and $Z_{62}$. In addition, the second coil portion 52 of the first coil 50 and the second coil portion 62 of the second coil 60 have symmetry, and particularly have a point-symmetric relationship with respect to the center of the element body 10 (or the center of the substrate 30). The second coil portion 52 of the first coil 50 and the second coil portion 62 of the second coil 60 are designed to have the same number of turns and the same conductor widths. In the present embodiment, the coil axis $Z_{52}$ of the second coil portion 52 and the coil axis $Z_{62}$ of the second coil portion 62 are aligned in the long-side direction of the element body 10 (that is, the facing direction of the end surfaces 10*c* and 10*d*).

Since the coil body 40 has the above-described configuration, when a voltage is applied between the pair of external terminals 20A and 20B and, for example, a current flows from the first external terminal 20A to the second external terminal 20B, the current from the first external terminal 20A flows through the first coil 50 of the coil body 40, then flows through the second coil 60, and reaches the second external terminal 20B. When current flows in this manner, since the winding direction of the first coil 50 and the winding direction of the second coil 60 are opposite to each other when viewed from the main surface 10*a* side of the element body 10, current flows clockwise in the first coil 50, whereas current flows counterclockwise in the second coil 60. As a result, magnetic fluxes directed from the main surface 10*a* toward the main surface 10*b* are generated inside (inner core) of the first coil 50, and magnetic fluxes directed from the main surface 10*b* toward the main surface 10*a* are generated inside (inner core) of the second coil 60. At this time, since the voltage drops with respect to the first external terminal 20A in the outer peripheral turn close to the first external terminal 20A in the second coil portion 52 of the first coil 50, as shown in FIG. 6, stray capacitance is generated in the element body region S between the outer peripheral turn of the second coil portion 52 and the first external terminal 20A. As the distances d (insulation distances) between the outer peripheral turn of the second coil portion 52 and the first external terminals 20A are shorter, larger stray capacitances are generated. In the present embodiment, the element body region S between the outer peripheral turn of the second coil portion 52 and the first external terminal 20A is constituted by the above-described resin body 42.

Since the coil body 40 of the coil component 1 includes the plurality of coils 50 and 60 and the first coil 50 is one of the plurality of coils included in the coil body 40, the current route (coil conductor) from the first external terminal 20A to the outer turn of the second coil portion 52 where stray capacitance occurs is significantly shorter than the current route between the pair of external terminals 20A and 20B, and the voltage drop in the outer turn of the second coil portion 52 is relatively small. On the other hand, when the coil body includes only one coil, the length of the current route from the external terminal to the outer peripheral turn of the coil portion on the lower surface of the substrate exceeds half of the length of the current route flowing between the pair of external terminals. Therefore, the voltage drop in the outer peripheral turn increases, and a large stray capacitance may occur between the outer peripheral turn and the external terminal.

In the coil component 1, with respect to the second coil 60, similarly to the first coil 50, a stray capacitance is generated in the element body region S between the outer peripheral turn close to the second external terminal 20B in the second coil portion 62 and the second external terminal 20B. In the present embodiment, the element body region S between the outer peripheral turn of the second coil portion 62 and the second external terminal 20B is constituted by the above-described resin body 42. Also, in the second coil 60, the current route from the second external terminal 20B to the outer peripheral turn of the second coil portion 52 where stray capacitance occurs is less than half of the current route between the pair of external terminals 20A and 20B. Therefore, the potential difference between the outer peripheral turn of the second coil portion 62 and the second external terminal 20B is small, and the stray capacitance occurring between the coil portion 62 and the second external terminal 20B is small.

In the coil component 1 in which the stray capacitance is reduced as described above, since the self-resonance frequency is increased and high impedance can be realized from a low band to a high band, high signal transmission characteristics can be realized by applying the coil component 1 to the PoC technology.

When viewed from the main surface 10*a* side of the element body 10, the coil axes $Z_{52}$ and $Z_{62}$ of the second coil portions 52 and 62 may be shifted from the coil axes $Z_{51}$ and $Z_{61}$ of the first coil portions 51 and 61. For example, by separating the coil axis $Z_{52}$ of the second coil portion 52 of the first coil 50 from the end surface 10*c* more than the coil axis $Z_{51}$ of the first coil portion 51, the length d between the outer peripheral turn of the second coil portion 52 and the first external terminal 20A increases, and the stray capacitance can be reduced. Similarly, by separating the coil axis $Z_{62}$ of the second coil portion 62 of the second coil 60 from the end surface 10*d* more than the coil axis $Z_{61}$ of the first coil portion 61, the length d between the outer peripheral turn of the second coil portion 62 and the second external terminal 20B increases, and the stray capacitance can be reduced.

In the above-described embodiment, the winding direction of the first coil 50 and the winding direction of the second coil 60 are opposite to each other when viewed from the main surface second side of the element body 10. However, as in the forms illustrated in FIGS. 7 and 8, the winding direction of the first coil 50 and the winding direction of the second coil 60 may be the same.

Figure 7:
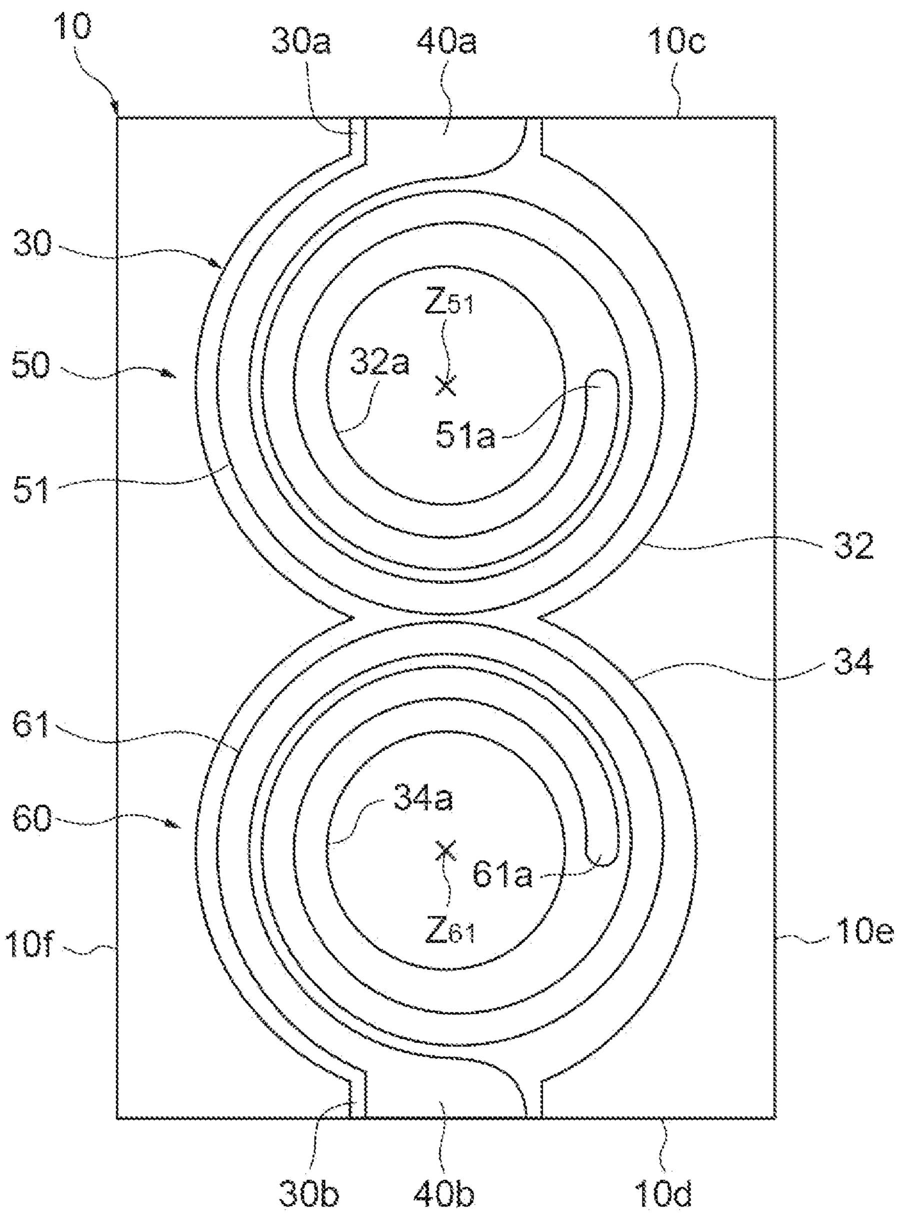
FIG. 7 is a plan view showing a first coil portion of each coil in a mode different from FIG. 5.

In this case, as shown in FIG. 7, when viewed from the main surface 10*a* side of the element body 10, the first coil portion 51 of the first coil 50 is wound counterclockwise from the outer peripheral turn toward the inner peripheral turn. Similarly, the second coil portion 61 of the second coil 60 is also wound counterclockwise from the inner peripheral turn toward the outer peripheral turn when viewed from the main surface 10*a* side of the element body 10. The first coil portion 51 of the first coil 50 and the second coil portion 61 of the second coil 60 have symmetry, and particularly have a line-symmetric relationship with respect to a line that is parallel to the end surfaces 10*c* and 10*d* and passes through the center of the element body 10 (or the center of the substrate 30).

Figure 8:
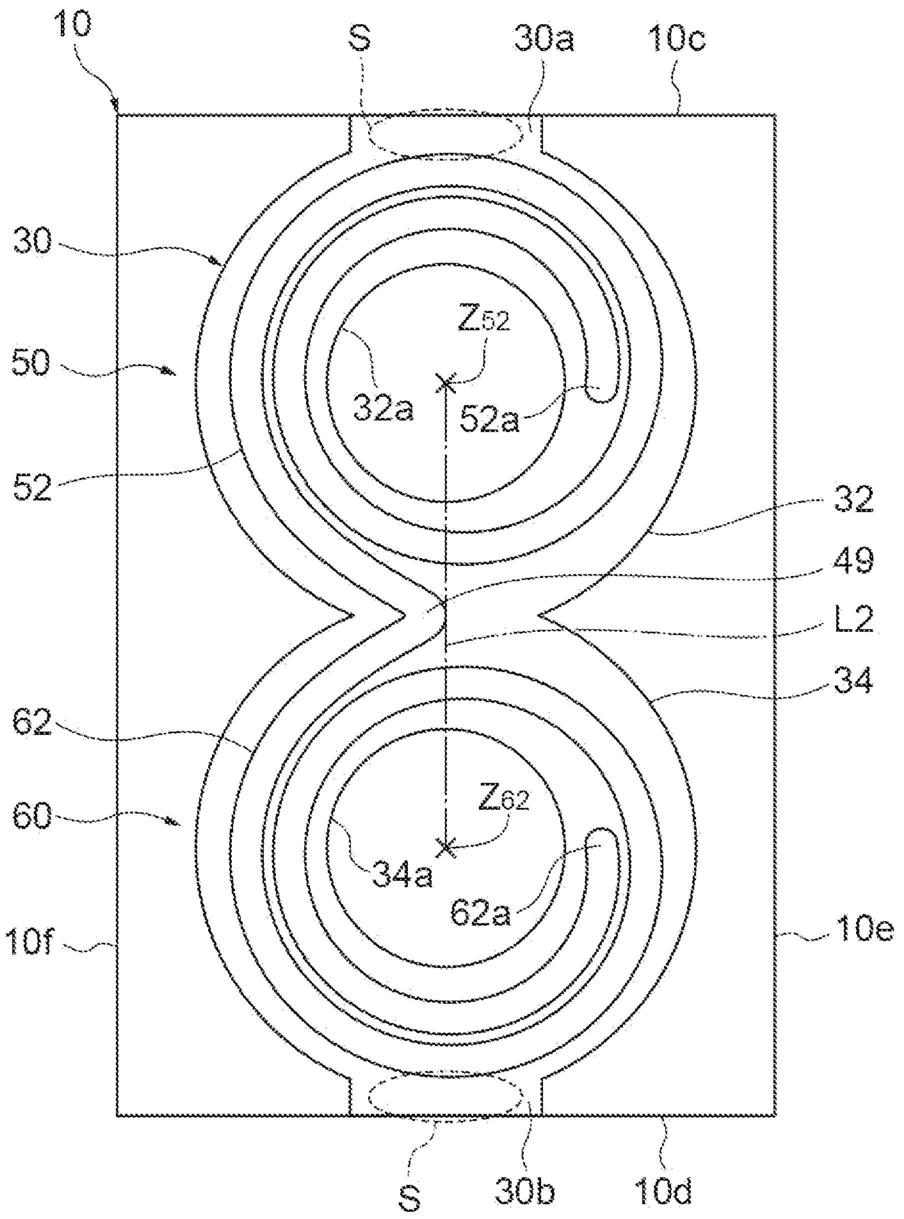
FIG. 8 is a plan view showing a second coil portion of each coil in a mode different from FIG. 6.

As shown in FIG. 8, the second coil portion 52 of the first coil 50 is wound counterclockwise from the inner peripheral turn toward the outer peripheral turn when viewed from the main surface 10*a* side of the element body 10. The second coil portion 62 of the second coil 60 is wound counterclockwise from the outer peripheral turn toward the inner peripheral turn when viewed from the main surface 10*a* side of the element body 10. The second coil portion 52 of the first coil 50 and the second coil portion 62 of the second coil 60 have symmetry, and in particular have a line-symmetric relationship with respect to a line that is parallel to the end surfaces 10_c_ and 10_d_ and passes through the center of the element body 10 (or the center of the substrate 30).

On the lower surface 30_d_ of the substrate 30, the connecting portion 49 in which the second coil portion 52 of the first coil 50 and the second coil portion 62 of the second coil 60 are connected is bent in a U shape or a V shape. The connecting portion 49 may be designed to overlap with or not to overlap with the imaginary line L2 connecting the coil axes $Z_{52}$ and $Z_{62}$.

In the embodiment shown in FIGS. 7 and 8, when a voltage is applied between the pair of external terminals 20A and 20B and a current flows from the first external terminal 20A to the second external terminal 20B, the current flows counterclockwise in the first coil 50 and the second coil 60 because the winding direction of the first coil 50 is the same as the winding direction of the second coil 60 when viewed from the main surface 10_a_ side of the element body 10. As a result, magnetic fluxes in a direction from the main surface 10_b_ toward the main surface 10_a_ are generated inside (inner core) of both the first coil 50 and the second coil 60. Also, in this embodiment, the lengths of the current routes from the first external terminal 20A to the outer peripheral turns of the second coil portion 52 where stray capacitance occurs and from the second external terminal 20B to the outer peripheral turns of the second coil portion 52 where stray capacitance occurs are significantly shorter than the lengths of the current routes flowing between the pair of external terminals 20A and 20B.

The present disclosure is not necessarily limited to the above-described embodiment, and various modifications can be made without departing from the scope of the present disclosure. For example, the number of coils included in the coil body is not limited to two, and may be three or more. The coils included in the coil body do not necessarily need to have symmetry, and the number of turns and the line width may be different for each coil. In addition, the number of turns and the line widths may be different between the first coil portion and the second coil portion of each coil.

What is claimed is:

1. A coil component comprising:

an element body having a pair of main surfaces facing each other, and a first end surface and a second end surface connecting the pair of main surfaces and parallel to each other;

a substrate provided in the element body, extending parallel to the main surface of the element body, and having a first main surface and a second main surface parallel to the main surface of the element body;

a coil body provided in the element body and including a plurality of coils each including a first coil portion in a spiral shape provided on the first main surface of the substrate, a second coil portion in a spiral shape provided on the second main surface of the substrate, and a through-hole conductor penetrating the substrate and electrically connecting the first coil portion and the second coil portion, the plurality of coils being connected in series and having one end portion exposed from the first end surface of the element body and the other end portion exposed from the second end surface of the element body; and a first external terminal provided on the first end surface of the element body and connected to one end portion of the coil body;

a second external terminal provided on the second end surface of the element body and connected to the other end portion of the coil body, wherein the plurality of coils of the coil body include a first coil located on the first end surface side and connected to one end portion of the coil body and a second coil located on the second end surface side and connected to the other end portion of the coil body.

2. The coil component according to claim 1, wherein the plurality of coils of the coil body are respectively wound around a plurality of through holes provided in the substrate.

3. The coil component according to claim 2, wherein the plurality of through holes are line-symmetric with respect to a reference line parallel to the first and second end surfaces of the element body when viewed from a facing direction of the pair of main surfaces.

4. The coil component according to claim 1, wherein a winding direction of the first coil and a winding direction of the second coil are opposite to each other when viewed from a facing direction of the pair of main surfaces.

5. The coil component according to claim 1, wherein, when viewed from a facing direction of the pair of main surfaces, a connection portion connecting the coils to each other extends to intersect an imaginary line connecting axes of both coils.

6. The coil component according to claim 1, wherein the coil body is point symmetric with respect to a center of the element body when viewed from a facing direction of the pair of main surfaces.

7. The coil component according to claim 1, wherein a coil end portion of the first coil portion of the first coil constitutes one end portion of the coil body and an axial position of the second coil portion of the first coil is farther from the first end surface than an axial position of the first coil portion when viewed from a facing direction of the pair of main surfaces, or, a coil end portion of the first coil portion of the second coil constitutes the other end portion of the coil body and an axial position of the second coil portion of the second coil is farther from the second end surface than an axial position of the first coil portion when viewed from a facing direction of the pair of main surfaces.

* * * * *